United States Patent
Roy et al.

(10) Patent No.: US 8,774,480 B2
(45) Date of Patent: Jul. 8, 2014

(54) MEDICAL IMAGE ENHANCEMENT TECHNIQUE BASED ON IMAGE TRANSFORM RESONANCE

(75) Inventors: Prasun Roy, Gurgaon (IN); V. P. Subramanyam Rallabandi, Gurgaon (IN)

(73) Assignees: Department of Biotechnology, New Delhi (IN); National Brain Research Centre, Haryana (IN)

( * ) Notice: Subject to any disclaimer, the term of this patent is extended or adjusted under 35 U.S.C. 154(b) by 564 days.

(21) Appl. No.: 12/992,470

(22) PCT Filed: Feb. 10, 2009

(86) PCT No.: PCT/IN2009/000096
§ 371 (c)(1),
(2), (4) Date: Feb. 1, 2011

(87) PCT Pub. No.: WO2009/138996
PCT Pub. Date: Nov. 19, 2009

(65) Prior Publication Data
US 2011/0116699 A1    May 19, 2011

(30) Foreign Application Priority Data

May 16, 2008 (IN) ............................. 1216/DEL/08

(51) Int. Cl.
*G06K 9/00* (2006.01)
(52) U.S. Cl.
USPC ........................................................ 382/131
(58) Field of Classification Search
USPC ............................ 382/128–132; 600/301, 410
See application file for complete search history.

(56) References Cited

PUBLICATIONS

Rallabandi et al (Enhancement of ultrasound images using stochastic resonance-based wavelet transform, computerized medical imaging and graphics, USA, NY, vol. 32, No. 4, pp. 316-320, electronically published on Apr. 2, 2008).*
NBRC; ("Annual Report, 2004-2005"; National Brain Research Centre; NH-8, Manesar (Haryana), India; pp. 61-63).*
Rajib Kumar Jha et al., "Enhancement of Digital Images Using Stochastic Resonance", in: TENCON 2005 IEEE, Region 10 Melbourne, Nov. 21-24, 2005, ISBN: 0-7803-9311-2, p. 1 to 6.
Renbin Peng et al., "Stochastic resonance: An approach for enhanced medical image processing", in: Life Science Systems and Applications Workshop, 2007, LISA 2007, IEEE/NIH, Bethesda, Nov. 8-9, 2007, ISBN: 978-1-4244-1813-8, p. 253 to 256.

(Continued)

*Primary Examiner* — Amara Abdi
(74) *Attorney, Agent, or Firm* — The Webb Law Firm

(57) ABSTRACT

A method for medical image enhancement based on image transform resonance. A novel method for Stochastic Resonance of medical image enhancement device based on the Integral Transform of the image, comprising: generating specific types of integral transforms like radon transform for CT, Fourier transform for MRI with image transform component; preparing stochastic perturbation waveform, with perturbator component performing the stochastic resonance on the image transform, with stochastic resonator component; characterizing the image enhancement factor of the SR-processed image with performance monitoring component; adjusting and controlling the bistability parameters of the double-well system that induces stochastic resonance with control component; arranging the provisional display of the array matrix of the SR-enhanced images, as the bistability parameters are varied with matrix display component; subjecting the final image to the step of display with final image display component.

10 Claims, 2 Drawing Sheets

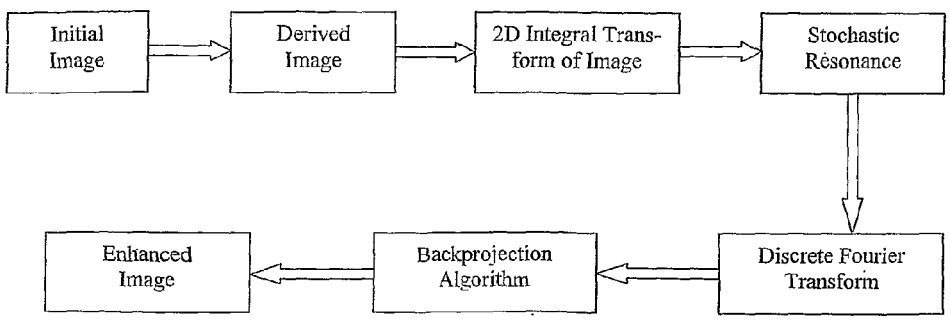

Image enhancement using the Integral Transform on which the Stochastic Resonance is induced: The Flow diagram.

(56) References Cited

PUBLICATIONS

V.P. Subramanyam Rallabandi, "Enhancement of ultrasound images using stochastic resonance-based wavelet transform", Computerized Medical Imaging and Graphics, Pergamon Press, New York, NY, US, vol. 32, No. 4, Jun. 2008, electronically published on Apr. 2, 2008, pp. 316-320, XP022595018.V.

Roy; "Stochastic Resonance Effect as a new technique for enhancement of Image Processing in neuroscience: Digital Modelling of the phenomenon in Computed Tomography and Tomotherapy as a case study"; Life Science Research Board (LSRB), Application for Grant of R&D Project under Grants-in-Aid Scheme of Life Sciences Research Board; Defence Research & Development Origanization, Ministry of Defence, Government of India, New Delhi.

Roy; "Stochastic Resonance Imaging and Stochastic Resonance Therapy: Preliminary Studies Considering Brain as Stochastic Processor"; Lecture Notes in Computer Science; pp. 96-103; 2004; vol. 3316.

Rallabandi et al.; "Stochastic Resonance-Based Tomographic Transform for Computed Tomographic Image Enhancement of Brain Lesions"; Comput Assist Tomogr; Nov./Dec. 2008; pp. 966-974; vol. 32, No. 6.

Rallabandi et al.; "Magnetic resonance image enhancement using stochastic resonance in Fourier domain"; Magnetic Resonance Imaging; 2010; pp. 1361-1373; vol. 28.

Roy; "Magnetic Resonance image enhancement using Stochastic Resonance in harmonic space"; Elsevier Editorial System (tm) for Computerized Medical Imaging and Graphics; Computerized Medical Imaging & Graphics, Jul. 29, 2007; Elsevier Ltd, New York.

NBRC; "Annual Report, 2004-2005"; National Brain Research Centre; NH-8, Manesar (Haryana), India; pp. 61-63.

NBRC; "Annual Report, 2006-2007"; National Brain Research Centre; NH-8, Manesar (Haryana), India; pp. 97-99.

\* cited by examiner

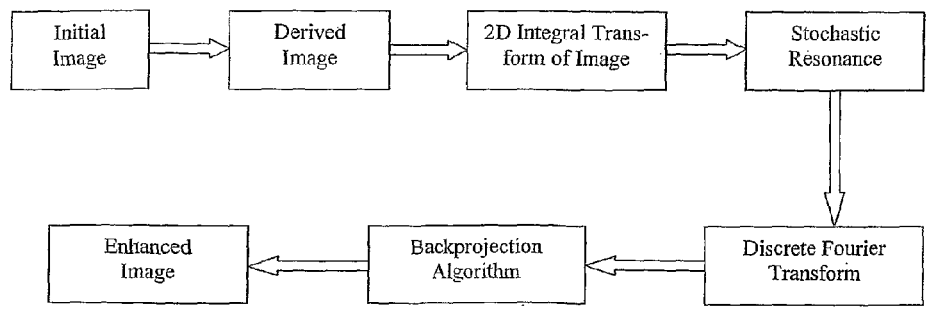

Fig 1. Image enhancement using the Integral Transform on which the Stochastic Resonance is induced: The Flow diagram.

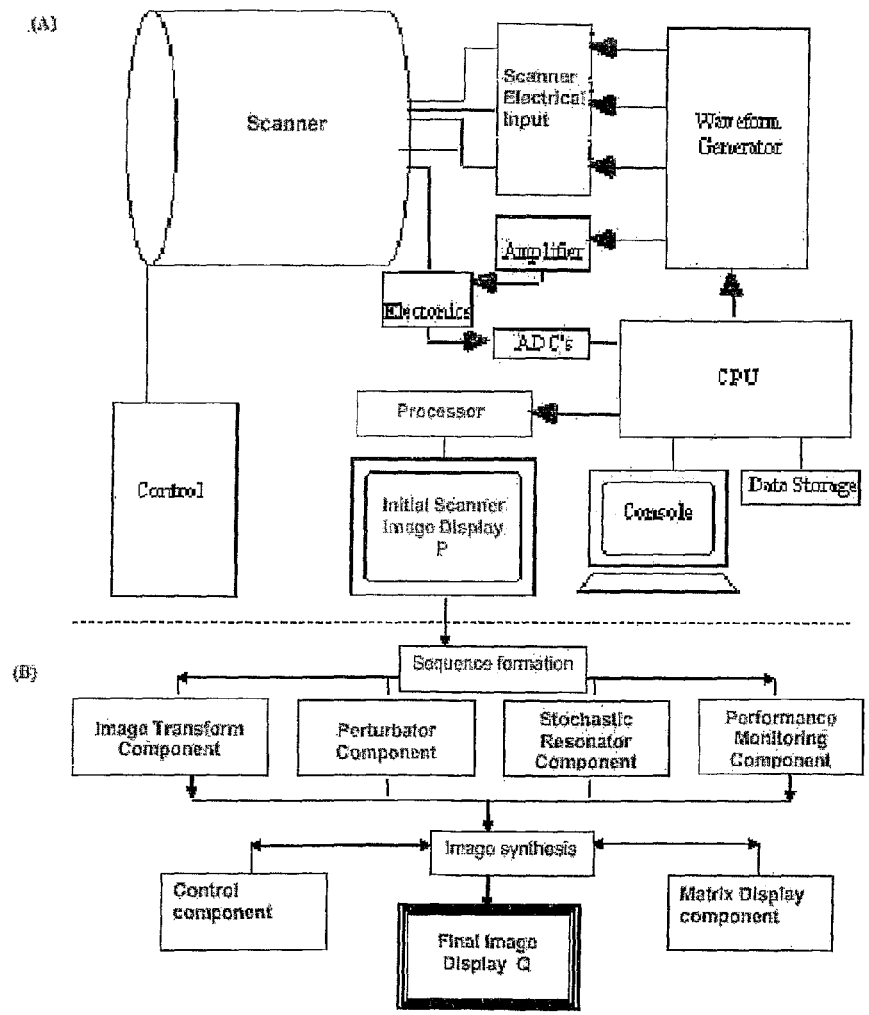

Fig. 2: Block diagram of the step-wise components of the Image Enhancement Technique:
The initial image P is obtained in the CT or MRI scanner [Schema (A)]; then the initial image P is subject to Image Transform Operation with Stochastic Resonance Induction [Schema (B)] so as to obtain the Final Enhanced image Q.

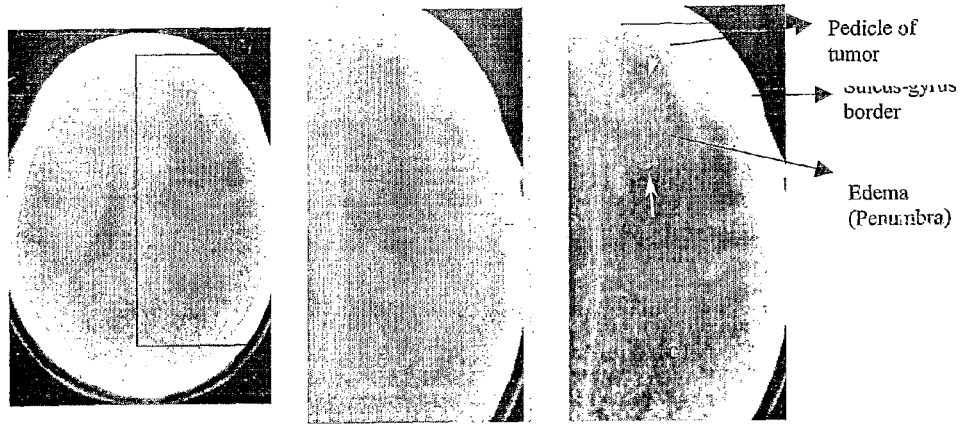

Fig 3. Use of the technique to enhance Computed Tomography (CT) imaging:
 (a) The initial CT Slice showing the lesion to be enhanced,
 (b) The cropped image of the lesion, namely the region of interest (ROI),
 (c) The stochastically-enhanced image, from which the radiological diagnosis is benign falx meningioma.

[Photocopies may not reproduce the enhancement properly]

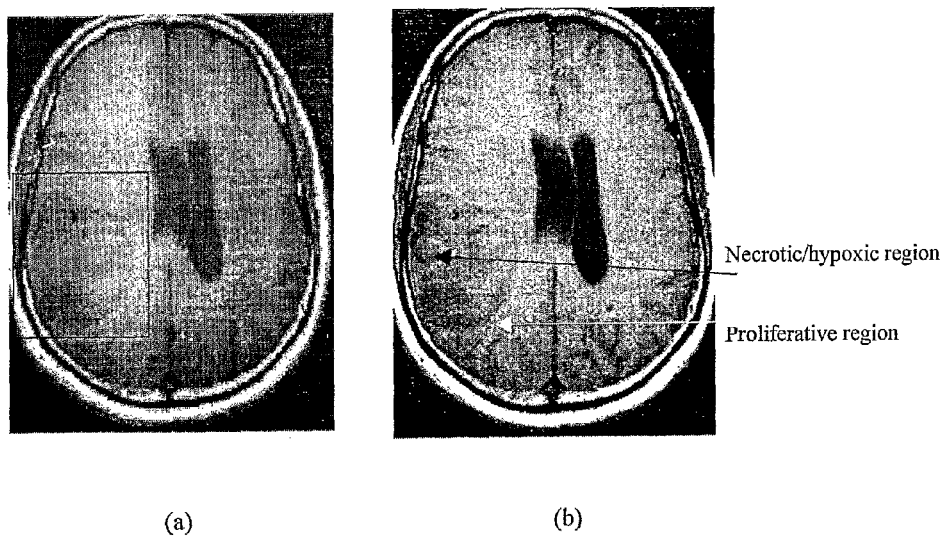

(a)  (b)

Fig 4. Use of the technique to enhance Magnetic Resonance Imaging (MRI):
 (a) The $T_1$-weighted MR image, showing the lesion in ROI,
 (b) The stochastically-enhanced image which shows that the lesion is clearly defined, while the distinction between the white matter and grey matter is marked, along with increased clarity of the ventricular contour, mass effect and the proliferative heterogeneity of the lesion, from which the radiological diagnosis is malignant glioma.

[Photocopies may not reproduce the enhancement optimally]

MEDICAL IMAGE ENHANCEMENT TECHNIQUE BASED ON IMAGE TRANSFORM RESONANCE

FIELD OF INVENTION

This invention relates to a novel technique, which is able to enhance an indistinct or noisy digital image, that has been acquired from medical imaging scanners as Computed Tomography (CT) and Magnetic Resonance Imaging (MRI).

BACKGROUND OF INVENTION

It may be remarked that earlier investigators have proposed procedures for upgradation of medical image to some extent, such techniques encompassing histogram equalization, adaptive filtering, or filtering approaches using multiple subimage schemata. However, the procedures are generally not adaptable to variable tissue intensities, and hence cannot give optimal enhancement. Moreover, none of the existing image enhancement technique is able to enhance different kinds of image modalities. Recently wavelet-based approach has been used to explore the possibility of selective image improvement, but here there are many more variables involved. In the latter case, the problem is that one has to tune, in advance, to some arbitrary scale-specific or scale-dependent parameters of the wavelets, which may be suboptimal.

The drawbacks and limitations on the existing techniques are that there is usually loss of information as basically a filtering operation is used on the image to filter out energy power residing in the stochastic noise component of the image. These filters lose some content of the image or may cause artifacts, both of which may hamper the diagnosis.

Furthermore, the majority of the above procedures are not tissue-selective nor tissue-adaptive, since, in general, the various structures in the image are enhanced evenly and monotonously together, as mentioned earlier. The existing techniques do not produce variegated contrast level among different regions, however such variegation is much desirable for proper perception of images.

There is actually a topical need of a proper medical image enhancement technique that can operate adaptively on the variegated texture of heterogeneous tissue image. With this desirability in mind, it may be mentioned that the principal of Stochastic Resonance (SR) has been studied by scientists for various applications to physical or biological systems, such as enhancement of sound detection or optical scattering. However, there in no literature available on SR application for medical image enhancement. Of course, the present invention is the first application of SR for diagnostic medical imaging system.

The SR technique of the present invention has proven effective and overcomes certain limitations in the existing techniques as information loss and unwanted artifacts due to filtering. The SR procedure of the present invention administers extra quality to the contrast of an image through the added stochastic fluctuations, and there is minimal power dissipation or information loss in the image.

The SR technique of the present invention is also lesion specific as the image processing operation, namely the stochastic integral transform (SIT), can be adapted locally to enhance the suspicious regions of tissue. The nature of the pixel-adaptive SIT mapping is such that it provides varying contrast in different regions, so that the entire image is neither enhanced equally nor monotonously. Further, the SR technique of the present invention can enhance different kinds of image modalities and has been tested on various lesions and tumours, under different imaging modalities as CT, MRI, etc. and imparts an excellent opportunity to clinicians and radiologists to enhance and diagnose the unclear or latent lesions in an image.

Although some procedures for image upgradation have been proposed, none of the existing techniques promises enhancement without information loss. The SR technique of the present invention enhances the edges of the lesion, delineates the edema segments more clearly, and demarcates the latent structural brain lesions, along with aiding more efficient discrimation of the different zones of the lesion. Furthermore, the SR technique of the present invention is also useful in broad-ranging image processing applications of a general nature.

The SR technique of the present invention enhances medical diagnostic images such as CT and MRI, and also upgrades such images when they are noisy or indistinct. This improvement of the image would help radiologists/clinicians to perform improved diagnosis.

The SR technique of the present invention also provides a general image enhancement technique that can be adapted locally to enhance suspicious regions of tissue.

The SR technique of the present invention also provides varying contrast in different regions, so that the full image is not enhanced equally and monotonously, but there are differential levels of contrast in different regions of the image, thereby leading to increased discriminability.

The SR technique of the present invention also:
counters noise and enhances medical diagnostic images;
delineates edges of a tumour or lesion, the oedema region and the infarction region;
discriminates various structures and zones in the lesion and in the surrounding areas;
is applicable to any imaging modality;
displays increased structuration of the image; and
offers more accurate estimate of the location and degree of the abnormality in the tissue.

STATEMENT OF INVENTION

Thiinvention relates to a novel Stochastic Resonance technique of medical image enhancement device b ased on Integral Transform of the image, comprising of the following step-wise elements. Image Transform component for generating specific types of Integral transforms like Radon transform for CT, Fourier transform for MRI. Perturbator component for preparing the stochastic perturbation waveform. Stochastic Resonator component for performing the stochastic resonance on the image transform. Performance monitoring component for characterizing the image enhancement factor of the SR-processed image. Control component for adjusting and controlling the bistability parameters of the double-well system that induces stochastic resonance. Matrix Display component for arranging the provisional display of the array matrix of the SR-enhanced images, as the bistability parameters are varied. Final Image display component for display of the maximally enhanced final output image.

BRIEF DESCRIPTION OF THE DRAWINGS

FIG. 1 Image enhancement using the Integral Transform on which the Stochastic Resonance is induced: The Flow diagram.

FIG. 2 Block diagram of the step-wise components of the Image Enhancement Technique:
The initial image P is obtained in the CT or MRI scanner [Schema (A)]; then the initial image P is subject to Image Transform Operation with Stochastic Resonance Induction [Schema (B)] so as to obtain the Final Enhanced image Q.

FIG. 3 Use of the technique to enhance Computed Tomography (CT) imaging:
a) The initial CT Slice showing the lesion to be enhanced,
b) The cropped image of the lesion, namely the region of interest (ROI),
c) The stochastically-enhanced image, from which the radiological diagnosis is benign falx meningioma.
[Photocopies may not reproduce the enhancement properly].

FIG. 4 Use of the technique to enhance Magnetic Resonance Imaging (MRI):
a) The $T_1$-weighted MR image, showing the lesion in ROI,
b) The stochastically—enhanced image which shows that the lesion is clearly defined, while the distinction between the white matter and grey matter is marked, along with increased clarity of the ventricular contour, mass effect and the proliferative heterogeneity of the lesion, from which the radiological diagnosis is malignant glioma.
[Photocopies may not reproduce the enhancement optimally].

DETAILED DESCRIPTION OF INVENTION

The invented technique is able to enhance a digital image acquired from scanners, as CT and MRI. The novelty is to add optimized noise to an already noisy or indistinct image, so as to enhance the contrast in the image. The addition of small amount of noise to a noisy image induces enhancement of the digital signal and this phenomenon is known as Stochastic Resonance (SR). The inventors administer the SR to the 2D-Radon domain for CT images and Fourier domain for MRI images, and the Inventors perform the image upgradation process by inventing a quantitative formulation that the inventors refer to as 'Stochastic Integral Transform' (SIT) (FIG. 1). The inventors further characterize and estimate the degree of the enhancement process by developing the quantitative concept and measurement of the image upgradation index.

This invention reports for the first time the proof-of-principle that the nonlinear dynamics-based principle of stochastic resonance is a useful procedure for image enhancement in CT, MR etc. Ever since the initiation of digital imaging technology about sixty years ago, image processing methodologies have been dominated by communication-based techniques, such as by using various filter which filters the image and reduces the total power in the image. On the other hand, the Inventors have developed a new image enhancement approach using the newer physics-based yet biologically-oriented development in nonlinear dynamics methodology discovered in their laboratory. The procedure improve the quality of an image by administering to the image a zero-mean white Gaussian noise thermodynamically by means of stochastic fluctuation. The invention uses our novel proposition of Stochastic Integral Transform (SIT), which has not been suggested by anyone earlier, and this transformation can be used strategically for improving the accession of imaging signals of the pathophysiolocial system, thereby aiding in improved diagnosis and treatment.

The feasibility and proof-of-principle has been shown as follows. The quantitative procedure with computational algorithms for image enhancement of CT and MR images has been developed and the procedure has been validated using tested images. Testing has been done for several kinds of lesions as parasitic, infective and malignant, like cysticercosis, glioma, meningioma, tuberculoma, astrocytoma, etc. The Inventors estimated the quality of the upgraded image using the Image Upgradation Index parameter whose concept and measurement that they have developed. The mean upgradation index of over all the tested CT images is about 165% and that of MR images 125%. Intended for use by a wide community of users in medical imaging, physicians, radiologists, biomedical engineers, neuroscientists and others, our image processing procedures has been coded using Matlab language, and the same can be extended to stand-alone executable platform independent of Matlab, for the end users. The package is convertible to a directly user-friendly procedure, for use by concerned scientists, clinicians and engineers in the field of imaging, diagnostics, therapeutics and image processing.

Stochastic resonance is a novel concept, whereby the addition of optimal stochastic fluctuation or noise-based perturbation, to a signal-operated system, enhances the signal and the system response. One of the well-known examples of a physical or computational system that undergoes stochastic resonance is that a particle in a double-well potential. Motivated by statistical physics, the inventors consider an overdamped motion of a Brownian particle system in the presence of noise and an external periodic force, with the system having a bistable potential P(x), where P(x) is given by:

$$P(x)=(m/2)\cdot x^2+(n/4)\cdot x^4$$

here m and n are the bistability parameters which jointly determine the double well's height and width, that is, the activation threshold and separation between the minima, respectively. Here, we model the image pixel under stochastic fluctuation, by means of a particle under thermodynamic fluctuation noise (Brownian motion). This fluctuation noise enables the particle (or pixel) to transit from one state to the other, i.e. from weak-signal state to strong-signal state. We assume here that the noise is zero-mean Gaussian white noise. The stochastic resonator (SR) of the noise-induced transition of the signal can be taken as:

$$x'(t)=dx/td=-P'(x)+A+N \qquad [1]$$

where A is the amplitude of the signal, N is a zero-mean input (the stochastic noise with variance $s^2$), and P'(x) is the differential of P(x) with respect to x and is given by $[mx+nx^3]$. Note that x'(t) implies differentiation of x(t) with respect to its variable t, while P'(x) indicates differentiation of P(x) with respect to the latter's variable x. The simulation is discretized in temporal steps of τ using Maruyama-Euler stochastic equation, given by:

$$x_v=x_u+\delta\tau(mx_u-nx^3_u+A+N)$$

where $x_u$ is the value of x at $n^{th}$ time-step, $x_v$ is the value of x at $(n+1)^{th}$ time-step, while δτ is the time interval between the temporal steps. The x'(t) parameter of eq. [1] forms the stochastic resonator (SR) of the system. Note that the initial condition is $x_0=x(0)$, i.e the value of x at time t=0. After the above, we now apply the stochastic resonator to the image to be enhanced. First, the gray level of given 2-D image I(x, y) is transformed to a zero-mean input, namely to a derived image I*(x, y) where:

$$I^*(x,y)=I(x,y)-I_0(x,y)$$

Where $I_0(x, y)$ is the spatial average value of the original 2-D image I(x, y) which is the MRI or CT image that we wish to enhance. Now, we administer the stochastic resonator (SR) to the respective integral transform domain, namely the 2-D Fourier transform domain of the derived image I*(x, y) in case of the MRI scan, or the 2-D Radon transform domain of the derived image I*(x, y) in case of the CT scan, where the Fourier Transform $T_F$ and Radon Transforms $T_R$ are respectively defined by:

$$T_F = \int_{-\infty}^{\infty}\int_{-\infty}^{\infty} I^*(x, y), e^{-i2\pi(k_x x + k_y y)} dx dy \quad (2)$$

$$T_R = \int_{-\infty}^{\infty}\int_{-\infty}^{\infty} I^*(x, y)\delta_D(x\cos\theta + y\sin\theta - P) dx dy \quad (3)$$

Where $k_x$ and $k_y$ are the Fourier wave vectors in k-space, and $\rho$ and $\theta$ are the polar coordinates, while $\delta_D$ is the Dirac Delta Function selecting the plane of projection (i.e., $\delta_D=1$ if x=0, whereas $\delta_D=0$ if x≠0). The Radon or Fourier transform can be generalized as an Integral Transform. Hence the administration of the Stochastic Resonator to the Integral Transform, can be taken to be a noise-activated transform $T_N$, that we name as the Stochastic Integral Transform (SIT), which is given in terms of a double integral over the 2-D plane of the image:

$$T_R = \int_{-\infty}^{\infty}\int_{-\infty}^{\infty} SRI*(x, y) T_G dx dy \quad (4)$$

Where SR is the stochastic resonance operator [see eq. (1)], and I*(x, y) is the derived image, while $T_G$ is the Generalized Integral Transform, such as 2D Fourier transform $T_F$ [given in eq. (2)] or the 2D Radon transform $T_R$ [given in eq. (3)]. The stochastic integral transform of the image $T_N$ of eq. (4) is then subject to discrete Fourier transform and then backprojection algorithm is applied to obtain the enhanced image. FIG. 1 shows the flow diagram of the above-mentioned scheme.

The step-wise elements of the proposed image enhancement system are (FIG. 2):
1. Image Transform component: This step performs the specific type of Integral Transformation as the case may be e.g. Radon transform for CT, Fourier transform for MRI, etc.
2. Perturbator component: This step prepares the stochastic perturbation waveform.
3. Stochastic Resonator component: This entry performs the stochastic resonance on the image transform.
4. Performance monitoring component: This moiety characterizes the image enhancement factor of the SR-processed image.
5. Control component: This entity can be used to control and adjust the bistability parameters of the double-well system (such as the parameters 'm' and 'n' which jointly determine the activation height and the separation width of the double well, which induces the stochastic resonance.
6. Matrix Display component: This step arranges for provisional display of the matrix of the various SR-enhanced images, as the bistability parameters are varied.
7. Final Image Display component: Display of the final output image, maximally enhanced.

The inventors present some results obtained using the proposed approach. The values of the parameters 'm' and 'n' were varied to furnish a matrix of different stochastically activated images. The maximally enhanced image was chosen from the matrix using the characteristic of the perceptual contrast discriminability in the image, namely the just-noticeable-difference in intensity (JND). The proposed algorithm produces adequate contrast in the output image, and results in almost no ringing artifacts even around sharp transition regions, which are a disadvantage in typical conventional contrast enhancement techniques. Some of our experimental results on CT and MRI modalities are shown below.

CT Images:

The proposed method was able to enhance the edges of lesion in CT images. FIG. 3(a) is the original CT image of a lesion in the frontal region of the brain and fails to show the edge of the tumor. The cropped image or region of interest (ROI) of the original image is shown in FIG. 3(b). The SR-enhanced image [FIG. 3(c)] furnishes appreciable clarity in the image, showing clearly the pedicle of the lesion, arising form the midline meningeal septum (falx cerebri).

The enhanced image is also able to better outline the sulcal-gyri architecture in the cortex, and well delineates the two zone sof the oedema region of the white matter, namely the umbral and penumbral zones of edema shown in FIG. 3(c). The enhanced image also demarcates the edges of the lesion (shown in white arrows) and makes it evident that the lesion's pedicle is attached to the midline dural falx cerebri, indicating the radiological diagnosis as benign frontal falxine meningioma.

MRI Images:

FIG. 4(a) shows a $T_1$-weighted MR image of a lesion in which the ROI is marked in the figure and one cannot distinguish the gray from white matter, while the lesion margin cannot be discerned. In the SR enhanced image in FIG. 4(b) the lesion boundary is clearly defined, while the white matter-grey matter distinction is marked, and ventricular contour has increased sharpness and clarity. Therein, in the upgraded image, the hyperintense peripheral regions of the lesion, which signify proliferative tissue activity (white arrow), can be noted, along with the hypointense core region that indicate necrotic/anoxic area (black arrow). One can also discern, in FIG. 4(b), the radiological mass effect of the lesion on the surrounding tissue, the shift being clearly observable in the shrinkage of the posterior border of the ventricle. The SR-enhanced image furnishes a more upgraded view of the heterogeneity and variegation of the intralesional architecture, along with a more distinct boundary between the lesion and extra-lesional brain parenchyma. The enhanced image indicates readily that the radiological diagnosis is malignant proliferative glioma tumor.

We claim:

1. A novel method for Stochastic Resonance of medical image enhancement device based on the Integral Transform of the image, comprising:
   i. generating specific types of integral transforms like radon transform for CT or Fourier transform for MRI with image transform component:
   ii. preparing stochastic perturbation waveform, with perturbator component;
   iii. performing the stochastic resonance (SR) on the image transform, with stochastic resonator component;
   iv. characterizing the image enhancement factor of the SR-processed image with performance monitoring component;
   v. adjusting and controlling bistability parameters of a double-well system that induces stochastic resonance with control component;
   vi. arranging a provisional display of an array matrix of the SR-enhanced images, as the bistability parameters are varied with matrix display component;
   vii. subjecting a final image to the step of display with final image display component.

2. The method as claimed in claim 1 wherein the image is acquired from CT or MRI scanners.

3. The method as claimed in claim 1 wherein the SR procedure administers extra quality to the contrast of an image through the added stochastic fluctuations so that there is minimal power dissipation or information loss in the image.

4. The method as claimed in claim 1 wherein the proposed technique is lesion specific as the output of the stochastic integral transform, SIT, can be adapted locally to enhance suspicious regions of tissue, almost no ringing artifacts even around sharp transition regions, which is a disadvantage in typical conventional contrast enhancement techniques.

5. A method as claimed in claim 1 wherein the nature of the pixel-adaptive SIT response is such that it provides carrying contrast in different regions of the lesion.

6. A method for Stochastic Resonance of medical image enhancement device based on the Integral Transform of the image, comprising:
   i. generating a radon transform for CT or a Fourier transform for MRI with image transform component;
   ii. preparing stochastic perturbation waveform with a stochastic perturbator component;
   iii. performing stochastic resonance (SR) on the image transform, with the stochastic perturbator component;
   iv. characterizing the image enhancement factor of the SR-processed image of step (iii) with a performance monitoring component;
   v. adjusting and controlling bistability parameters of a double-well system that induces stochastic resonance with control component;
   vi. arranging a provisional display of an array matrix of the SR-enhanced images, as the bistability parameters are varied with matrix display component; and
   vii. displaying a final image selected from the array matrix of step (vi) on a display component.

7. The method as claimed in claim 6, wherein the image is acquired from CT or MRI scanners.

8. The method as claimed in claim 6, wherein the SR procedure adjusts the contrast of an image through stochastic fluctuations, whereupon power dissipation or information loss in the image is avoided.

9. The method as claimed in claim 6, wherein integral transform is adapted locally to enhance regions of tissue while avoiding ringing artifacts.

10. A method as claimed in claim 6, wherein the integral transform response provides varying contrast in different regions of lesion.

* * * * *